US006848418B1

(12) United States Patent
Summers et al.

(10) Patent No.: US 6,848,418 B1
(45) Date of Patent: Feb. 1, 2005

(54) EXTERNAL EXHAUST GAS RECIRCULATION ON BOARD DIAGNOSTIC USING EGR EFFECT ON A COMBINATION OF ENGINE OPERATING PARAMETERS

(75) Inventors: David Howard Summers, Cheylesmore (GB); Simon Oliver Sutton, Cheylesmore (GB); Paul John King, Loughborough (GB)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/705,467

(22) Filed: Nov. 10, 2003

(51) Int. Cl.[7] .............................. F02D 41/14; F02P 5/15; F02M 25/07
(52) U.S. Cl. .............................. 123/339.11; 123/339.23; 123/568.16; 123/568.27; 123/680
(58) Field of Search ................. 123/339.11, 339.14, 123/339.19, 339.23, 396, 399, 680, 568.11, 568.16, 568.21, 568.25, 568.27; 73/117.3, 116, 118.1, 118.2; 701/108

(56) References Cited

U.S. PATENT DOCUMENTS

| 4,715,348 | A | | 12/1987 | Kobayashi et al. ........... 73/116 |
| 5,184,594 | A | | 2/1993 | Saitoh et al. .......... 123/406.13 |
| 5,309,887 | A | | 5/1994 | Kondo et al. .......... 123/568.16 |
| 5,513,616 | A | * | 5/1996 | Matsumoto et al. ... 123/568.16 |
| 6,182,644 | B1 | * | 2/2001 | Kotwicki et al. ...... 123/568.16 |
| 6,257,214 | B1 | * | 7/2001 | Bidner et al. .......... 123/568.16 |
| 6,321,732 | B1 | | 11/2001 | Kotwicki et al. ...... 123/568.16 |
| 6,393,345 | B1 | | 5/2002 | Kerns et al. ................... 701/34 |
| 6,434,474 | B1 | | 8/2002 | Kotwicki et al. ........... 701/108 |
| 6,459,985 | B1 | | 10/2002 | Kotwicki et al. ........... 701/103 |
| 6,497,227 | B2 | * | 12/2002 | Wang et al. ........... 123/568.16 |
| 6,564,778 | B2 | | 5/2003 | Isobe et al. ................. 123/479 |
| 6,687,601 | B2 | * | 2/2004 | Bale et al. ................... 701/108 |
| 2001/0035172 | A1 | * | 11/2001 | Osaki et al. ........... 123/568.16 |

FOREIGN PATENT DOCUMENTS

EP          1 239 142 A2       9/2002

* cited by examiner

Primary Examiner—Willis R. Wolfe, Jr.
(74) Attorney, Agent, or Firm—Allan J. Lippa

(57) ABSTRACT

A system is described for determining degradation of an exhaust gas recirculation system of an internal combustion engine. This method utilizes a combination of parameters to accurately determine degradation of the exhaust gas recirculation system. For example, the system utilizes changes in intake manifold pressure, changes in idle speed control operation, changes in ignition timing, and fueling changes to accurately determine operation of the exhaust gas recirculation system.

12 Claims, 3 Drawing Sheets

EXTERNAL EXHAUST GAS RECIRCULATION ON BOARD DIAGNOSTIC USING EGR EFFECT ON A COMBINATION OF ENGINE OPERATING PARAMETERS

FIELD OF THE INVENTION

The field of the present invention relates generally to routines and methods for determining degradation in an exhaust gas recirculation system.

BACKGROUND OF THE INVENTION

Engine systems utilize exhaust gas recirculation (EGR) to reduce engine generated NOx emissions, while at the same time increasing fuel economy by reducing engine pumping work. In EGR systems, exhaust gas from the exhaust manifold is typically routed to the intake manifold downstream of the engine throttle plate. However, degradation in EGR components can lead to degraded EGR operation. As such, various methods are available to monitor and diagnose such EGR degradation.

One such method is described in U.S. Pat. No. 4,715,348 (Kobayashi et al.). In this system, several embodiments are described for determining degradation of an EGR system. In one embodiment, variation in intake manifold pressure is used. In another embodiment, variation in the detected intake air amount is utilized. In still another embodiment, variation in temperature is utilized.

The inventors herein however, have recognized a disadvantage with such an approach. In particular, as emission requirements become greater and greater, simply using a single detection parameter can lead to inaccurate detection.

Another approach is described in EP 1239142 (Morikawa). In Morikawa, an engine controller feedback controls the open degree of an EGR valve such that an actual intake air amount matches a target intake air amount that corresponds to a running state of the engine. When feedback control is outside a relatively wide range, the controller alters the opening degree of the throttle in order to check for abnormalities in the EGR apparatus.

The inventors herein have also recognized a disadvantage with Morikawa. Specifically, simply using a feedback term in the feedback control of the EGR can lead to false abnormality detections since numerous other engine operating parameters can affect the EGR feedback control other than degradation of the EGR system.

SUMMARY OF THE INVENTION

The above disadvantages are overcome by:

By utilizing both a change in manifold pressure and operation of the second valve, it is possible to accurately identify degradation of the EGR system. For example, in the case where a second valve is a throttle (or a bypass valve) maintaining engine idle speed, the actuating of the first valve will cause both a change in the manifold pressure as well as a change in the second valve in order for the second valve to maintain engine idle speed. As such, degradation of the system can be accurately determined.

DETAILED DESCRIPTION OF THE INVENTION

Figure 1:
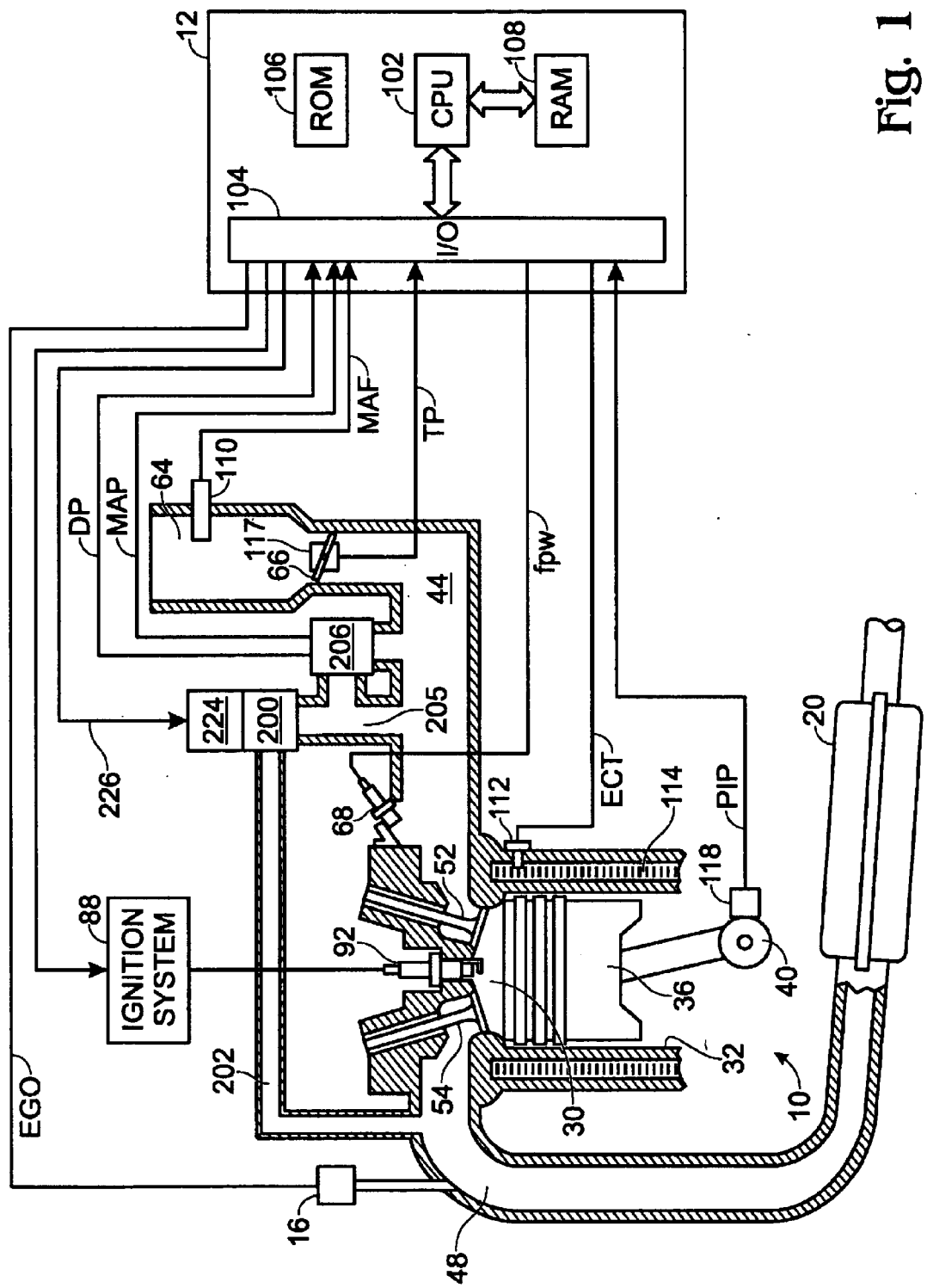
FIG. 1 shows an engine system.

Internal combustion engine 10 comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 communicates with intake manifold 44 and exhaust manifold 48 via respective intake valve 52 and exhaust valve 54. Exhaust gas oxygen sensor 16 is coupled to exhaust manifold 48 of engine 10 upstream of catalytic converter 20.

Intake manifold 44 communicates with throttle body 64 via throttle plate 66. Intake manifold 44 is also shown having fuel injector 68 coupled thereto for delivering fuel in proportion to the pulse width of signal (fpw) from controller 12. Fuel is delivered to fuel injector 68 by a conventional fuel system (not shown) including a fuel tank, fuel pump, and fuel rail (not shown). Engine 10 further includes conventional distributorless ignition system 88 to provide ignition spark to combustion chamber 30 via spark plug 92 in response to controller 12. In the embodiment described herein, controller 12 is a conventional microcomputer including: microprocessor unit 102, input/output ports 104, electronic memory chip 106, which is an electronically programmable memory in this particular example, random access memory 108, and a conventional data bus.

Controller 12 receives various signals from sensors coupled to engine 10, in addition to those signals previously discussed, including: measurements of inducted mass air flow (MAF) from mass air flow sensor 110 coupled to throttle body 64; engine coolant temperature (ECT) from temperature sensor 112 coupled to cooling jacket 114; a measurement of manifold pressure (MAP) from manifold pressure sensor 206 coupled to intake manifold 44; a measurement of throttle position (TP) from throttle position sensor 117 coupled to throttle plate 66; and a profile ignition pickup signal (PIP) from Hall effect sensor 118 coupled to crankshaft 40 indicating and engine speed (N).

Exhaust gas is delivered to intake manifold 44 by a conventional EGR tube 202 communicating with exhaust manifold 48, EGR valve assembly 200, and EGR orifice 205. Alternatively, tube 202 could be a internally routed passage in the engine that communicates between exhaust manifold 48 and intake manifold 44. Flow Sensor 206 communicates with EGR tube 202 between valve assembly 200 and orifice 205. Flow sensor 206 also communicates with intake manifold 44. Stated another way, exhaust gas travels from exhaust manifold 44 first through valve assembly 200, then through EGR orifice 205, to intake manifold 44. EGR valve assembly 200 can then be said to be located upstream of orifice 205.

Flow sensor 206 provides a measurement of manifold pressure (MAP) and pressure drop across orifice 205 (DP) to controller 12. Signals MAP and DP are then used to calculate EGR flow. EGR valve assembly 200 has a valve position (not shown) for controlling a variable area restriction in EGR tube 202, which thereby controls EGR flow. EGR valve assembly 200 can either minimally restrict EGR flow through tube 202 or completely restrict EGR flow through tube 202. Vacuum regulator 224 is coupled to EGR valve assembly 200. Vacuum regulator 224 receives actuation signal (226) from controller 12 for controlling valve position of EGR valve assembly 200. In a preferred embodiment, EGR valve assembly 200 is a vacuum actuated valve. However, as is obvious to those skilled in the art, any type of flow control valve may be used, such as, for example, an electrical solenoid powered valve or a stepper motor powered valve.

Note that alternative EGR systems can also be used, such as those having an orifice upstream of the EGR control valve. Further, systems utilizing a stepper motor valve without an orifice can also be used. Engine Management Systems (EMS) for internal combustion engines use external Exhaust Gas Recirculation (EGR) to improve both emissions and fuel economy. As described above, this is controlled by use of a valve in pipework between the exhaust system and the inlet manifold of the engine. In order to achieve the desired emissions and fuel economy of the vehicle it is important to accurately control the EGR valve. Further, it is important to monitor degradation of the EGR system and notify the driver via the On-Board Diagnostic (OBD) system and indication lamp. The OBD System therefore, in one example, monitors flow of external EGR via other inputs into the EMS.

One embodiment of the diagnostic strategy of the present invention uses existing EMS parameters. Specifically, during an intrusive EGR operation at idle, the idle speed control mechanism within a feedback idle speed control system will adapt to minimize the noticeable effect to the driver of the EGR valve operation. This is achieved by modifying the airflow through the engine and also the spark advance of the ignition system which will ensure the engine speed is maintained at the target idle speed. This operating thereby affects manifold pressure, idle airflow, spark advance and fuelling feedback parameters. These parameters are therefore monitored during the diagnostic operation and are used as judgment criteria for the diagnostic. An acceptable shift of each of these parameters, or a subcombination of them, is defined whereby a shift less than this amount would indicate less EGR flow than expected, and a shift of these parameters greater than this amount would indicate more EGR flow than expected. The idle conditions necessary for this diagnostic strategy are readily achieved resulting in high frequency of operation.

Figure 2:
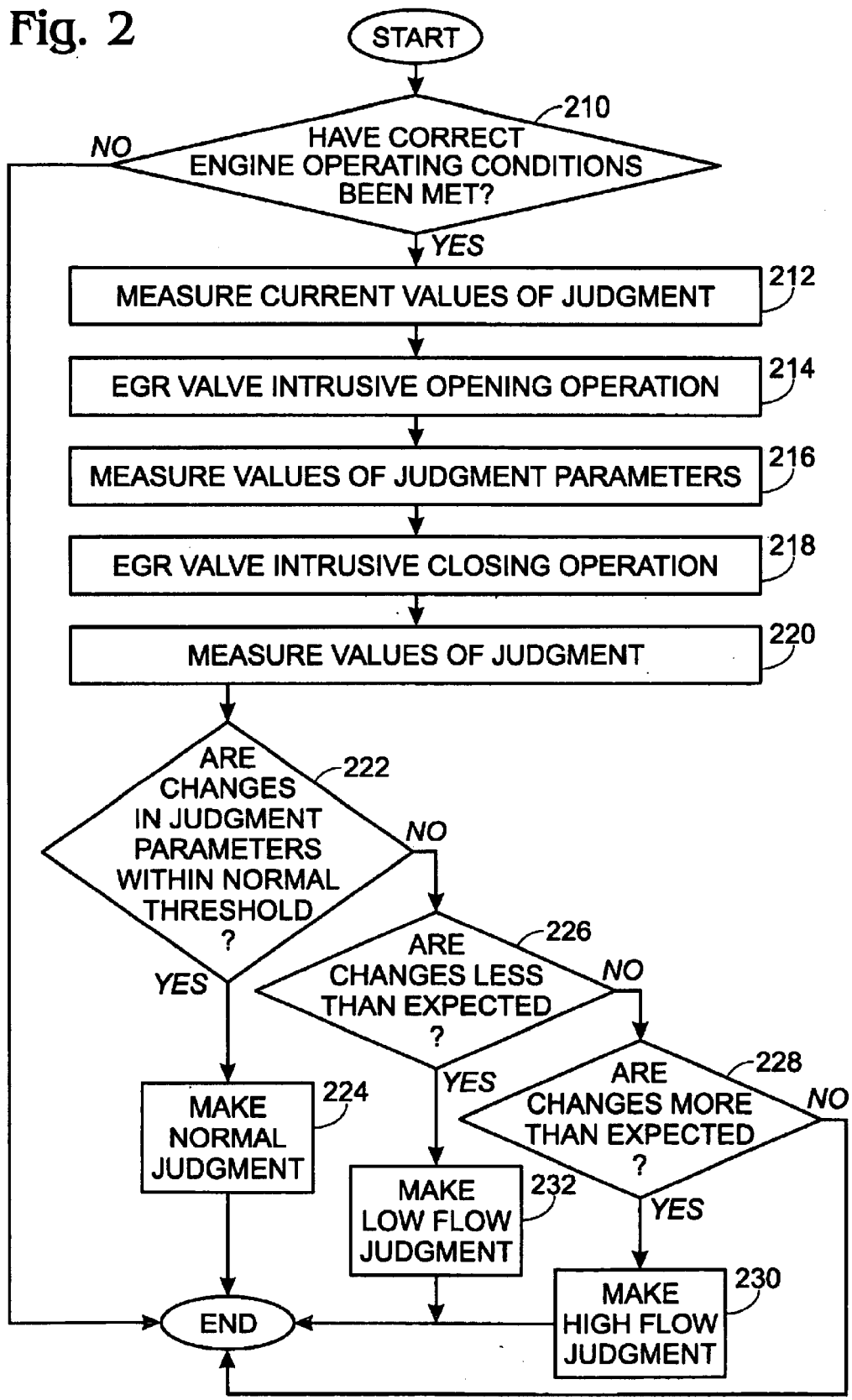
FIG. 2 shows a high level flow chart including EGR control.

Referring now specifically to FIG. 2, a routine is described illustrating one example embodiment of the EGR diagnostic routine of the present invention. Specifically, an intrusive test is performed, that is the valve is commanded to operate to a greater extent than it normally would be, at particular engine operating conditions, to achieve emissions and fuel economy benefits. The intrusive test is performed when the correct operating conditions are met, as indicated in step 210.

Before, during and after this intrusive test, the engine parameters are monitored to ensure a change is observed which matches the expected change to demonstrate the EGR valve flow characteristics. In order to limit the possibility of unusual operating conditions adversely affecting the diagnostic result, the intrusive test is performed, in one example, during steady state operating conditions which are both repeatable and readily occur on a normal drive cycle. The driving condition that best meets these criteria, is when the engine is idling. When the engine is idling the external factors, which may affect the diagnostic result, are limited. Limiting the external factors that can change during diagnostic operation improves the robustness of diagnostic judgment in ensuring that an accurate judgment is made. If the engine ceases to be in the idling condition during the test, the test is aborted and reinitialized at the next opportunity.

Referring now specifically to FIG. 2, in step 210, the routine determines whether the correct engine operating conditions are present to enable the EGR diagnostic. Specifically, the routine determines whether the engine is currently operating in an idle speed feedback control position. When the answer to step 210 is yes, the routine continues to step 212. In step 212, the routine measures the current values of the monitored parameters. In one example, the monitored parameters include intake manifold pressure, the idle speed feedback control adjustment parameter, ignition timing feedback adjustment, and air-fuel feedback adjustment. Note, however, that various subcombinations and combinations of these parameters can be used, or all of the parameters can be used together. Also note that various different parameters can be substituted such as, for example: intake air flow, or idle speed control position, or idle speed control valve actuation signal can be used as indicative of the idle speed feedback control adjustment value. Likewise, if the system utilizes an electronically controlled throttle in lieu of a mechanically operated throttle in addition to an idle speed control valve, then the command or position of the electronically controlled throttle can be used.

Next, in step 214, the routine adjusts the EGR valve to open greater than normally required under the current operation conditions. Then, in step 216, the routine again measures the judgment parameters discussed above with regard to step 212. Next, in step 218, the routine closes the EGR valve to return it to its normal operating state under the present operating conditions. Then, in step 220, the routine again measures the judgment parameters discussed above with regard to step 212 and 216.

Continuing with FIG. 2, in step 222, the routine determines whether changes in the judgment parameters are within the normal threshold value. When the answer to step 222 is yes, the routine continues to step 224 to indicate that the EGR system is functioning within acceptable limits.

When the answer to step 222 is no, the routine continues to step 226. In step 226, the routine determines whether the changes in judgment parameters are less than expected. When the answer to step 226 is Yes, the routine continues to step 232 where it indicates that low EGR flow has been detected. Further, the routine indicates this via illuminating an indicator lamp to inform the driver.

When the answer to step 226 is no, the routine continues to step 228. In step 228, the routine determines whether changes in the judgment parameters are greater than expected. When the answer to step 228 is yes, the routine continues to step 230 where it indicates EGR flow is greater than expected and illuminates an indicator lamp to inform the driver.

When the answer to step 228 is no, the routine continues to the end and the routine repeats.

Figure 3:
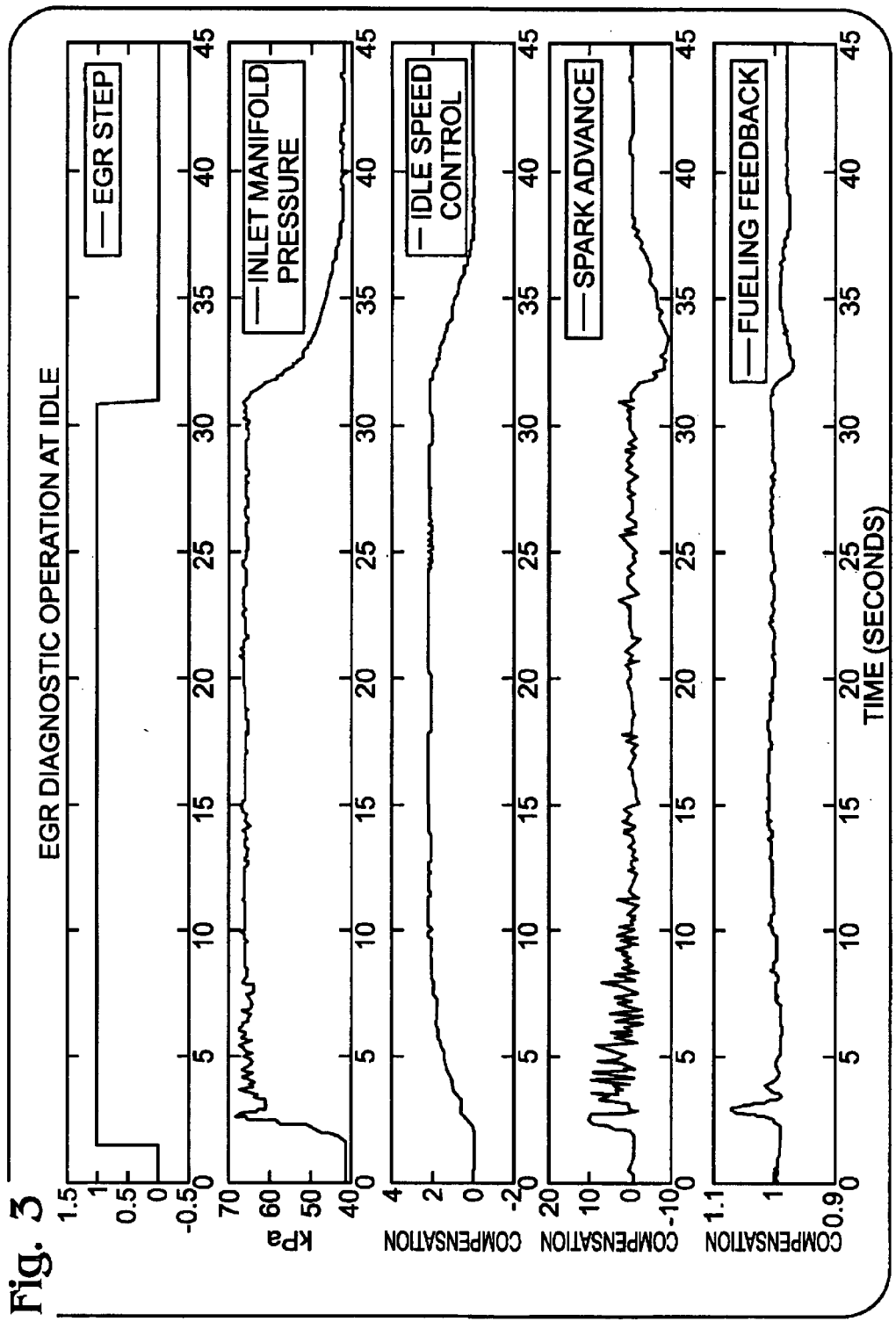
FIG. 3 shows experimental test data.

Referring now to FIG. 3, example experimental results are indicated for the EGR diagnostic operation.

The manifold pressure is the highest frequency response and the idle speed control airflow compensation also shows a pronounced effect over the duration of the test. These judgment criteria are utilized to show whether the EGR valve has opened, and whether EGR is flowing at expected levels. By also analyzing the spark advance compensation and the fueling feedback compensation this allows additional analysis to determine that exhaust gas is actually recirculating and that the external pipework has not been damaged resulting in excess fresh air entering the inlet manifold.

We claim:

1. A method for determining degradation of a first valve coupled between an exhaust manifold and an intake manifold of an internal combustion engine, said first valve allowing exhaust gas to flow from the exhaust manifold to the intake manifold, the engine also having a second valve coupled to the intake manifold that allows fresh air to flow into the intake manifold, the method comprising:

determining whether preselected conditions are present;

actuating said first valve to open greater than a requested amount to evaluate flow of the gas;

monitoring at least both an intake manifold pressure and operation of said second valve during said actuation;

comparing said monitored pressure and said operation to expected values; and evaluating the flow of the gas based on said comparison.

2. The method recited in claim 1, wherein preselected Condition includes engine idling.

3. The method recited claim 1, wherein said first valve is an electrically actuated exhaust gas recirculation valve.

4. The method recited claim 1, wherein said first valve is a vacuum actuated exhaust gas recirculation valve.

5. The method of claim 1, wherein said second valve is an electronically controlled throttle.

6. The method of claim 1, wherein said second valve is an idle air bypass valve.

7. The method of claim 1, wherein said monitoring of said operation of said second valve includes monitoring a position of said second valve.

8. The method of claim 1, wherein said monitoring of said operation of said second valve includes monitoring amount of air flow through said second valve.

9. The method of claim 1, wherein said operation of said second valve is determined to maintain an engine speed at a desired engine idle speed.

10. The method of claim 1, wherein said monitoring further includes monitoring adjustments in ignition timing during said actuation, and wherein said comparing further includes comparing adjustments in ignition timing to expected values.

11. The method of claim 1, further comprising correcting engine fuel injection based on said evaluation.

12. The method of claim 1, wherein said monitoring further includes monitoring adjustment in fuel command based on feedback from an exhaust gas oxygen sensor, and wherein said comparing further includes comparing said fuel adjustment to expected values.

* * * * *